(12) United States Patent
Tilinski et al.

(10) Patent No.: US 8,726,640 B2
(45) Date of Patent: May 20, 2014

(54) DEVICE FOR THE AFTERTREATMENT OF EXHAUST GASES OF INTERNAL COMBUSTION ENGINES

(75) Inventors: Marco Tilinski, Schwaig (DE); Andreas Klingsporn, Winkelhaid (DE); Andreas Döring, München (DE); Andreas Kistner, Merkendorf (DE); Petra Seidel, Stein (DE)

(73) Assignee: MAN Truck & Bus AG, Munich (DE)

( * ) Notice: Subject to any disclaimer, the term of this patent is extended or adjusted under 35 U.S.C. 154(b) by 672 days.

(21) Appl. No.: 12/950,242

(22) Filed: Nov. 19, 2010

(65) Prior Publication Data

US 2011/0113759 A1      May 19, 2011

(30) Foreign Application Priority Data

Nov. 19, 2009   (DE) .......................... 10 2009 053 950

(51) Int. Cl.
*F01N 3/00* (2006.01)
*F01N 3/10* (2006.01)
*F01N 1/00* (2006.01)

(52) U.S. Cl.
USPC ................. 60/286; 60/295; 60/301; 60/303; 60/324

(58) Field of Classification Search
USPC ............. 60/286, 295, 301, 303, 324
See application file for complete search history.

(56) References Cited

U.S. PATENT DOCUMENTS 7,581,389 B2 * 9/2009 Crawley et al. ................. 60/297

FOREIGN PATENT DOCUMENTS

| DE | 40 38 054 | | 6/1992 |
|---|---|---|---|
| DE | 42 03 807 | | 8/1993 |
| DE | 4203807 | * | 8/1993 |
| DE | 43 08 542 | | 9/1994 |
| EP | 1052009 | | 11/2000 |

* cited by examiner

*Primary Examiner* — Thomas Denion
*Assistant Examiner* — Diem Tran
(74) *Attorney, Agent, or Firm* — Cozen O'Connor

(57) ABSTRACT

A device for the aftertreatment of exhaust gases in an exhaust gas system of internal combustion engines, having at least one reductant decomposition catalyst. Arranged in the exhaust gas flow, and a metering device arranged upstream of the latter in an exhaust gas line for supplying reductant. Preferably at least one other catalyst device is provided downstream of the reductant decomposition catalyst. An inlet section for the exhaust gas having at least one flow deflection area is arranged upstream of the reductant decomposition catalyst and constructed for the exhaust gas to be fed into a housing radially outside an inlet pipe adjoining the reductant decomposition catalyst that encloses the inlet pipe, and is guided in counterflow through a front inlet opening of the inlet pipe to the reductant decomposition catalyst. The reductant is fed into the flow deflection area associated with the inlet opening.

14 Claims, 4 Drawing Sheets

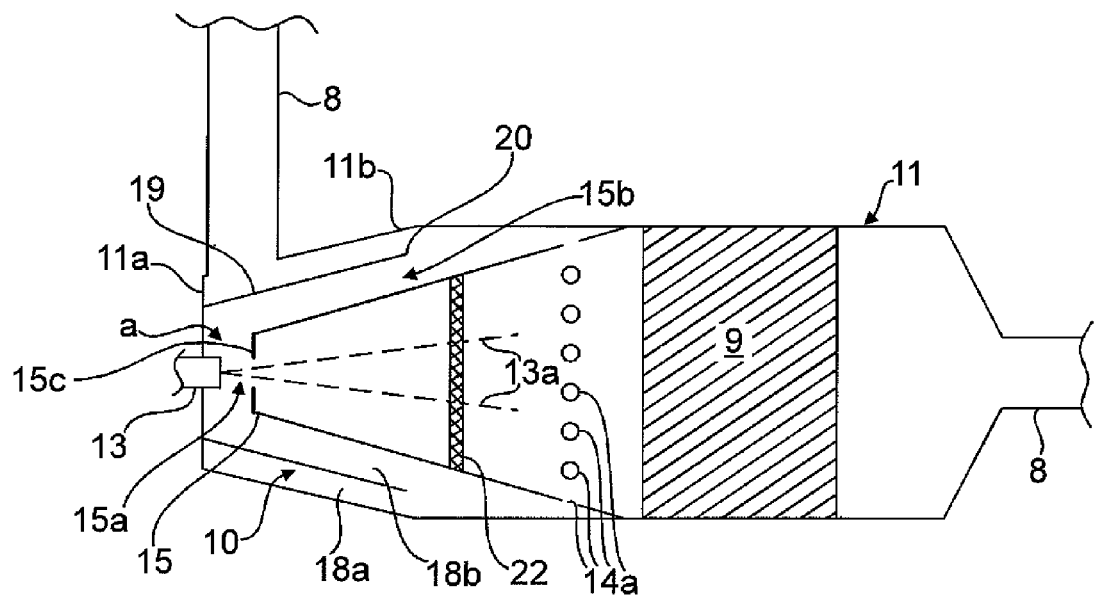
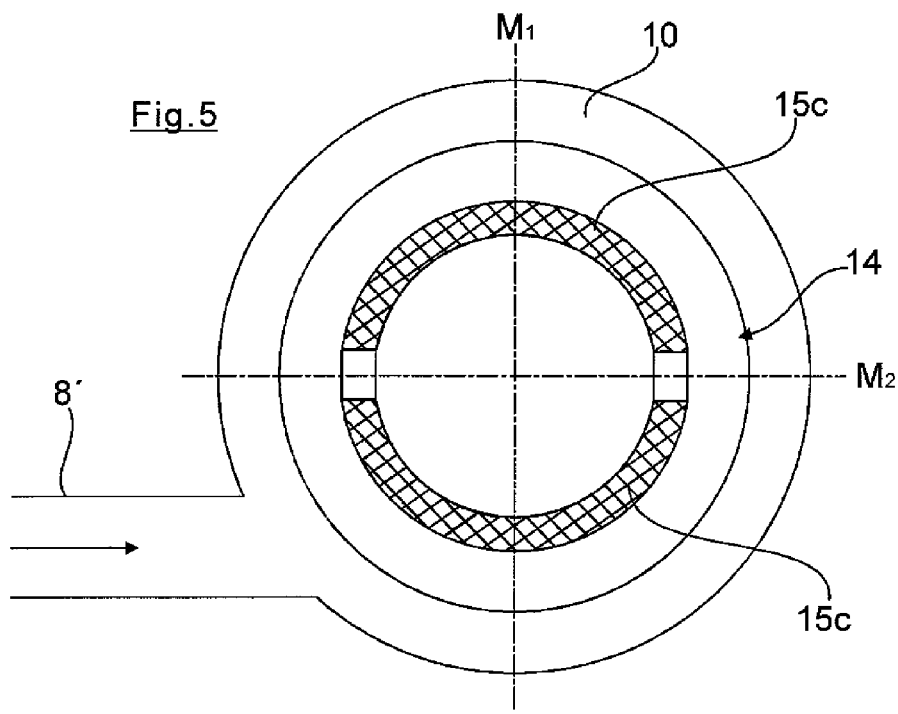

US 8,726,640 B2

DEVICE FOR THE AFTERTREATMENT OF EXHAUST GASES OF INTERNAL COMBUSTION ENGINES

BACKGROUND OF THE INVENTION

1. Field of the Invention

The invention is directed to a device for the aftertreatment of exhaust gases of internal combustion engines, particularly of lean-burn internal combustion engines in motor vehicles

2. Description of the Related Art

The use of selective catalytic reduction (SCR) catalysts to reduce nitrogen oxides in a stream of exhaust gas in an internal combustion engine is well known. For purposes of the SCR carried out by these SCR catalysts, a substance having a directly reductive action, e.g., ammonia or a precursor, which first releases reductive substances in the exhaust gas is fed to the stream of exhaust gas. An aqueous urea solution, for example, can be used as a precursor.

In internal combustion engines operated in motor vehicles, nitrogen oxide reduction by the SCR method is difficult because of changing operating conditions, which makes it more difficult to apportion the reductant in the correct quantities. Preferably, the conversion of nitrogen oxides should be as high as possible, while care must be taken to prevent unnecessary emission of unreacted reductant, e.g., ammonia.

In connection with the decomposition of urea in ammonia, it is known that this takes place in two stages under optimal conditions, i.e., at temperatures above 350° C. First, thermolysis, i.e., the thermal decomposition, of urea takes place according to the following reaction:

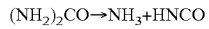

This is followed by hydrolysis, that is, the catalytic decomposition, of isocyanic acid (HNCO) into ammonia ($NH_3$) and carbon dioxide ($CO_2$) according to the following reaction:

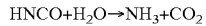

Due to the fact that the reductant is in aqueous form when the liquid reducing agent known as AdBlue® is used, this water must evaporate prior to and during the actual thermolysis and hydrolysis. If the temperatures during the above-mentioned reaction are below 350° C. or if heating is only gradual, chiefly solid, infusible cyanuric acid is formed through trimerization of the isocyanic acid, which leads to solid deposits in, or even clogging of, the SCR catalyst. As is described in DE 40 38 054 A1, this problem can be remedied in that the exhaust gas stream charged with the reductant is guided through a hydrolysis catalyst. Thus, the exhaust gas temperature at which a quantitative hydrolysis is possible can be lowered to 160° C.

In order to reduce the catalysts while maintaining a constant dwell time in the catalysts, the hydrolysis catalysts can also be operated in a partial stream of exhaust gas that is removed from the exhaust gas stream and then fed back into the exhaust gas stream after hydrolysis. A corresponding arrangement is shown in EP 1052009 A1. However, when the exhaust gas temperatures are too low, this method does not fully solve the problem of incomplete hydrolysis of urea.

Therefore, it is advantageous when the partial stream of exhaust gas is removed as close as possible to the engine so that the hydrolysis catalyst can be operated at a high temperature level. Further, in turbocharged internal combustion engines it is advantageous to remove the partial flow of exhaust gas already prior to the turbocharger and to return it downstream of the turbocharger.

In spite of all of these steps, it is often not possible to prevent the formation of cyanuric acid, melamine, or other unwanted solid reaction products, particularly when the $NH_3$ precursor substance, such as urea or aqueous urea solution, and the exhaust gas are not uniformly distributed over the entire flow cross section. In this respect, it is especially critical when large quantities of reductant impinge locally on pipe walls or urea decomposition catalysts while, at the same time, there is a local minimum of flow velocity at this location. As a result of this, the amount of heat available from the exhaust gas is not sufficiently high to ensure a quantitative decomposition of the reductant into $NH_3$. Instead, the deposits of unwanted reductant decomposition products mentioned above form at these locations.

This effect is aggravated by the fact that there is only a very limited installation space available in vehicles for processing the reductant, which results in very short inlet lengths, especially with regard to the incident flow of catalysts, leading in turn to a very poor homogeneity of distribution over the catalyst cross section due to dead zones, cross-sectional discontinuities, and/or flow separation.

Other devices for the aftertreatment of exhaust gases are shown, for example, in DE 42 03 807 A1 and DE 43 08 542 A1 in which an aqueous urea solution, as reductant, is fed to the exhaust gas stream via a nozzle of a metering device and is converted into $NH_3$ and $CO_2$ by thermal and catalytic reaction in a downstream hydrolysis catalyst. The nitrogen oxides NOx contained in the exhaust gas stream are then extensively reduced to nitrogen and water vapor in the SCR catalyst arranged downstream of the hydrolysis catalyst.

SUMMARY OF THE INVENTION

An object of one embodiment of the invention is a device for the aftertreatment of exhaust gases in an exhaust gas system in internal combustion engines, particularly in lean-burn internal combustion engines, of motor vehicles, e.g., utility vehicles, which makes possible a functionally improved, particularly a quantitatively improved, decomposition of the reductant in the exhaust gas in a simple, reliably functioning manner and which requires only a small installation space.

A device for the aftertreatment of exhaust gases in an exhaust gas system in internal combustion engines, particularly lean-burn internal combustion engines, for motor vehicles is provided with at least one reductant decomposition catalyst, particularly a hydrolysis catalyst, arranged in the exhaust gas flow. Further, a metering device is arranged upstream of the reductant decomposition catalyst in an exhaust gas line for supplying reductant, particularly for supplying an aqueous urea solution. Further, a catalyst device which is formed in particular by at least one SCR catalyst is preferably provided downstream of the reductant decomposition catalyst. According to the invention, an inlet section for the exhaust gas having at least one flow deflection area is arranged in front of the reductant decomposition catalyst and is constructed in such a way that the exhaust gas is fed into a housing portion radially outside an inlet pipe adjoining the reductant decomposition catalyst, which housing portion encloses the inlet pipe, and is guided in counterflow through a front inlet opening of the inlet pipe to the reductant decomposition catalyst, wherein the reductant is fed into the flow deflection area of the exhaust gas flow, which flow deflection area is associated with the inlet opening.

By this relatively simple construction, the inlet section can be augmented substantially in comparison to a conventional inlet pipe or inlet funnel on the housing side, while at the same time achieving a good homogeneously distributed incident flow and intensive heating of the inner inlet pipe and reductant decomposition catalyst, so that they can very rapidly reach temperatures at which an effective and efficient decomposition of the reductant is initiated. Residues and deposits of the reductant are prevented to a great extent because of the heating of the inlet funnel by the exhaust gas that is guided on the outside in counterflow. In so doing, by one or more deflections, the section along which the exhaust gas flows in can be advantageously lengthened so that a more homogeneous flow results compared to a short, conventional flow-in section.

The uniform distribution of the flow can be additionally improved by throttling or partial throttling. To this end, at least one throttling device for throttling or partial throttling of the exhaust gas flow can be provided in the area of the inlet section upstream of the reductant feed and/or the flow cross section can be smaller upstream of the reductant feed than downstream of the reductant feed.

Accordingly, the exhaust gas aftertreatment system according to one embodiment of the invention advantageously allows a quantitative decomposition of the reductant without impairing the efficiency of the internal combustion engine.

Further, it is preferably provided that the through-flow volume in the inlet section outside the inlet pipe is smaller than the through-flow volume inside the inlet pipe. Apart from the most compact possible constructional shape, among other advantages, this also ensures a high flow velocity of the exhaust gas, e.g., in the area of a nozzle for the reductant feed with an effective swirling of the reductant, and then causes a calming of the flow and a homogenization with a homogeneous distribution of the reductant inside the inlet pipe.

Further, it is possible to feed the exhaust gas into the inlet section outside the inlet pipe in such a way that a swirl forms in the flow so as to further influence the flow. This can preferably be achieved in that the feed into the inlet section is inclined at a defined angle, in particular not at a right angle, to the wall of the inlet section, and/or is carried out so as to be eccentrically offset with respect to the center axis (axes) of the housing lying in the cross-sectional plane through the housing.

The flow can be additionally influenced through installed structures in the forward area of the inlet pipe, downstream of the location for metering the reductant. For example, these installed structures can be plates which project into the flow thereby increasing turbulence. However, care must be taken to prevent reductant from impinging on these installed structures to avoid deposits on the structures. Alternatively, in principle the inlet opening can also be limited by a circumferential edge that generates flow turbulence which can be formed by a circumferential edge having notches. The quantity, geometry and spacing of the notches must be suitably selected based on the specific case.

Apart from the uniform distribution of flow, the distribution of the reductant in the exhaust gas train should be as homogeneous as possible. All of the steps mentioned above can also be used to improve the uniform distribution of the reductant in the exhaust gas flow in that the distribution of the reductant is influenced indirectly by suitable guidance of the exhaust gas flow.

However, a problem which often arises in this regard is that as the diameter of the droplets or particles in the reductant increases, this reductant follows the flow of exhaust gas only to a limited extent and, instead, the trajectory of the droplet or particles is determined by their own momentum. As a result, the concentration of reductant may be too high at certain locations. The lower the exhaust gas temperatures, the more problematic this becomes because, owing to the endothermic reaction and—when the reductant is dissolved in water—the occurring enthalpy of vaporization, the exhaust gas can be cooled locally to the extent that deposits can form at downstream catalysts, particular at the reductant decomposition catalysts.

For this reason, it is advantageous to forgo a uniform distribution of flow and, instead, to adapt the velocity profile of the flow in such a way that high flow velocities are present in areas of high concentrations or amounts of reductant. By this step, more exhaust gas enthalpy is available locally for the decomposition of the reductant and the vaporization of the water contained in the reductant solution.

In principle, the inlet pipe can have any cross-sectional shape, i.e., can be, for example, cylindrical or angular. However, in a particularly preferable manner, the inlet pipe is formed by a funnel-shaped or conical inlet funnel which narrows in diameter toward the inlet opening so that the inlet opening simultaneously forms a throttle cross section.

The inner walls of the inlet pipe can advantageously be provided with a catalytically active coating. The coating can preferably comprise $TiO_2$, $SiO_2$, $AlO_2$, or can be formed of zeolites and contributes to a further improvement in decomposition of the reductant into $NH_3$ (ammonia) and to preventing deposits at the respective exhaust gas-carrying parts.

According to one embodiment of the present invention, it is provided that a vaporizer and/or mixer is arranged downstream of the reductant feed. According to a specific embodiment form for this purpose, it is provided that a vaporizer and/or mixer having a defined distance from the inlet opening is arranged in the inlet pipe, preferably so as to be inserted in the inlet pipe to about two-thirds of the length of the inlet pipe considered from the inlet opening. An optional vaporizer and/or mixer of this kind allows an even more intensive uniform distribution of the metered reductant in the area of the inlet pipe.

According to a preferred embodiment, a nozzle of the metering device for feeding the reductant is arranged in the flow deflection area of the exhaust gas flow associated with the inlet opening and/or is directed toward the inlet opening. In this way, the reductant can reach the inlet pipe and, therefore, the reductant decomposition catalyst reliably and in its entirety.

In this connection, it is advantageous in terms of design and fluidics when the nozzle is arranged at a front wall of the housing portion which encloses the inlet pipe and is arranged at a defined distance opposite the inlet opening of the inlet pipe. The nozzle can be arranged coaxial to the longitudinal center axis of the inlet pipe with respect to its injection direction into the inlet opening of the inlet pipe so as to allow a more functionally reliable centered metering into the inlet pipe. Alternatively, the nozzle can also be arranged so as to be eccentrically offset with respect to the longitudinal center axis of the inlet pipe so that the local amount of reductant is adapted to the local flow velocities in a simple manner, which facilitates a good mixing of the reductant and the exhaust gas flow.

According to one embodiment of the invention, one or more, preferably a plurality of, circumferentially distributed bypass openings can be formed at the inlet pipe, by which bypass openings the inlet section and flow deflection area can preferably be bypassed and/or by which the exhaust gas counterpressure upstream of the inlet section can be reduced to a desired extent. There is a risk of excessive deflection of the reductant jet particularly when the flow velocity in the area of the reductant feed, i.e., in the nozzle area, for example, is too high. In order to prevent this, a bleeding off can also be carried out via the at least one bypass opening in order to reduce the flow velocity in the reductant feed area, i.e., in the nozzle area, for example. The bypass openings bring about an improvement in the uniform distribution in the immediate vicinity of the inlet surface of the reductant decomposition catalyst and a direct, temperature-increasing incident flow thereof.

Further, to achieve good flow conditions, at least one additional throttling location for the inflowing exhaust gas can be provided in the housing portion surrounding the inlet pipe upstream of the flow deflection area associated with the inlet opening of the inlet pipe and, accordingly, upstream of the reductant feed and outside of the inlet pipe. The flow velocity can be influenced locally by this throttling location, or by a plurality of such throttling locations, specifically in such a way that desired flow conditions and turbulence in the thermal inlet section are present or can be adjusted in the deflection area or in the area of the nozzle of the metering device. The throttling location is preferably formed, e.g., by at least one cross-sectional narrowing in an annular space enclosing the inlet pipe, which cross-sectional narrowing is formed in particularly by an annular wall and/or perforated plate which opens a through-flow gap. Particularly in the case already mentioned above, where the flow velocity is too high in the area of the reductant feed, i.e., in the nozzle area, for example, so that there is a risk of excessive deflection of the reductant jet, it can be provided, as an alternative or in addition to bleeding off via the at least one bypass opening, that the throttling location is arranged at a defined distance from the inlet opening of the inlet pipe. In so doing, the throttling location is preferably arranged about midway between the at least one bypass opening and the inlet opening.

In one embodiment of the invention, at least one additional gas guide pipe can be arranged in the housing portion radially outside the inlet pipe, which gas guide pipe causes a gas flow in a meandering shape with the exhaust gas flow being deflected a number of times between the exhaust gas line opening into this area and the reductant decomposition catalyst or within the inlet section. In this way, a further lengthening of the inlet section can be provided with minor extra expenditure on construction so that throttles may be omitted if desired.

In this connection, the gas guide pipe can preferably be fastened to a front wall of the housing portion enclosing the inlet pipe and, e.g., can have a cone angle which is substantially similar to that of the inlet pipe. Alternatively, the at least one additional gas guide pipe can also be formed by a plurality of pipes which are nested one inside the other and/or connected to one another, particularly by a plurality of conical pipes which are nested one inside the other and/or connected to one another. When the at least one gas guide pipe is conically shaped, the housing portion enclosing the gas guide pipe is preferably likewise conically shaped, and the cross-sectional areas defining the meandering gas flow are formed either so as to be substantially identical or so as to be at least partially narrowed, e.g., in order to form at least one throttling location.

Further, a rapid heating of the reductant decomposition catalyst can be achieved in that the reductant decomposition catalyst is provided with outer thermal insulation at least in a housing portion having the inlet pipe and/or in the area of the inlet section, so that the heat losses into the surroundings are reduced.

The device as described thus far can be integrated in an exhaust gas line through which the entire exhaust gas flow is conducted. However, it is suggested that only a partial flow of the exhaust gas of the internal combustion engine is preferably guided over the reductant decomposition catalyst via a branch line in a manner known per se. To this end, at least one throttling device controlling the partial flow can be provided in the branch line and/or in the exhaust gas line. The desired amount of exhaust gas of the partial flow can be determined in a relatively simple manner by the exhaust gas counterpressure caused by the throttling device.

In a particularly simple construction, an oxidation catalyst and/or a diesel particulate filter can be arranged as a throttling device in the exhaust gas line, wherein the branch line branches off upstream of the oxidation catalyst and/or upstream of the diesel particulate filter. In this way, without extra expenditure, the exhaust gas counterpressure caused by these devices is used in combination with the constructional shape of the branch line, reductant decomposition catalyst and inlet section to branch off the desired amount of exhaust gas.

In principle, the partial flow can also be branched off upstream and/or downstream of a turbine of an exhaust gas turbocharger of the internal combustion engine arranged in the exhaust gas line.

However, in a particularly preferred construction, alternatively or in addition to the construction of the throttling device described above, the throttling device can be the turbine of an exhaust gas turbocharger of the internal combustion engine arranged in the exhaust gas line, wherein the branch line then branches off upstream of the exhaust gas turbine.

Further, a throttle valve can be arranged in the branch line upstream of the reductant decomposition catalyst for variable control of the throughput of the partial flow of the exhaust gas depending on defined internal combustion engine parameters and/or operating parameters, particularly at least depending on load signals and/or rotational speed signals of the internal combustion engine, by which, for example, unsteady operation of internal combustion engines in motor vehicles can be taken into account to a great extent. The amount of exhaust gas as well as the amount of injected reductant can be deliberately controlled by these and possibly other operating parameters. Alternatively, the throttle valve can also be arranged in the exhaust gas line.

Finally, in an internal combustion engine with a plurality of, particularly two, groups of cylinders or banks of cylinders and a plurality of, particularly two, partially separate exhaust gas systems, only a partial flow of an exhaust gas system can be guided over the reductant decomposition catalyst, and/or the group of cylinders or bank of cylinders associated with this exhaust gas system can be operated with operating parameters and/or engine parameters which are defined differently than at least a portion of the rest of the groups of cylinders or banks of cylinders, particularly can be controlled in a mode with increased exhaust gas temperature. The partial flow of exhaust gas is then fed to the exhaust gas systems again preferably upstream of the at least one SCR catalyst. The cylinder groups or, as the case may be, the cylinder banks can be operated by an engine control device in such a way that the exhaust gas temperature is increased, for example, in the start phase and/or in a low-load range, in the cylinder group in which the hydrolysis catalyst and metering device for the reductant are connected, in order to ensure a fast-acting and efficient decomposition, while the other cylinder group is operated at optimum efficiency.

Further, a $NH_3$ slip catalyst can be arranged downstream of the at least one SCR catalyst to prevent ammonia slip.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Several embodiment examples of the invention will be described more fully with additional details in the following. In the drawings:

FIG. 4 is an alternative embodiment of the hydrolysis catalyst with a deflecting plate arranged in the area of the inlet opening of an inlet funnel;

FIG. 5 is a schematic front view of the inlet opening of the inlet funnel with deflecting plate and with a non-90° eccentric exhaust gas flow feed in the area of the inlet section.

DETAILED DESCRIPTION OF THE PRESENTLY PREFERRED EMBODIMENTS

Figure 1:
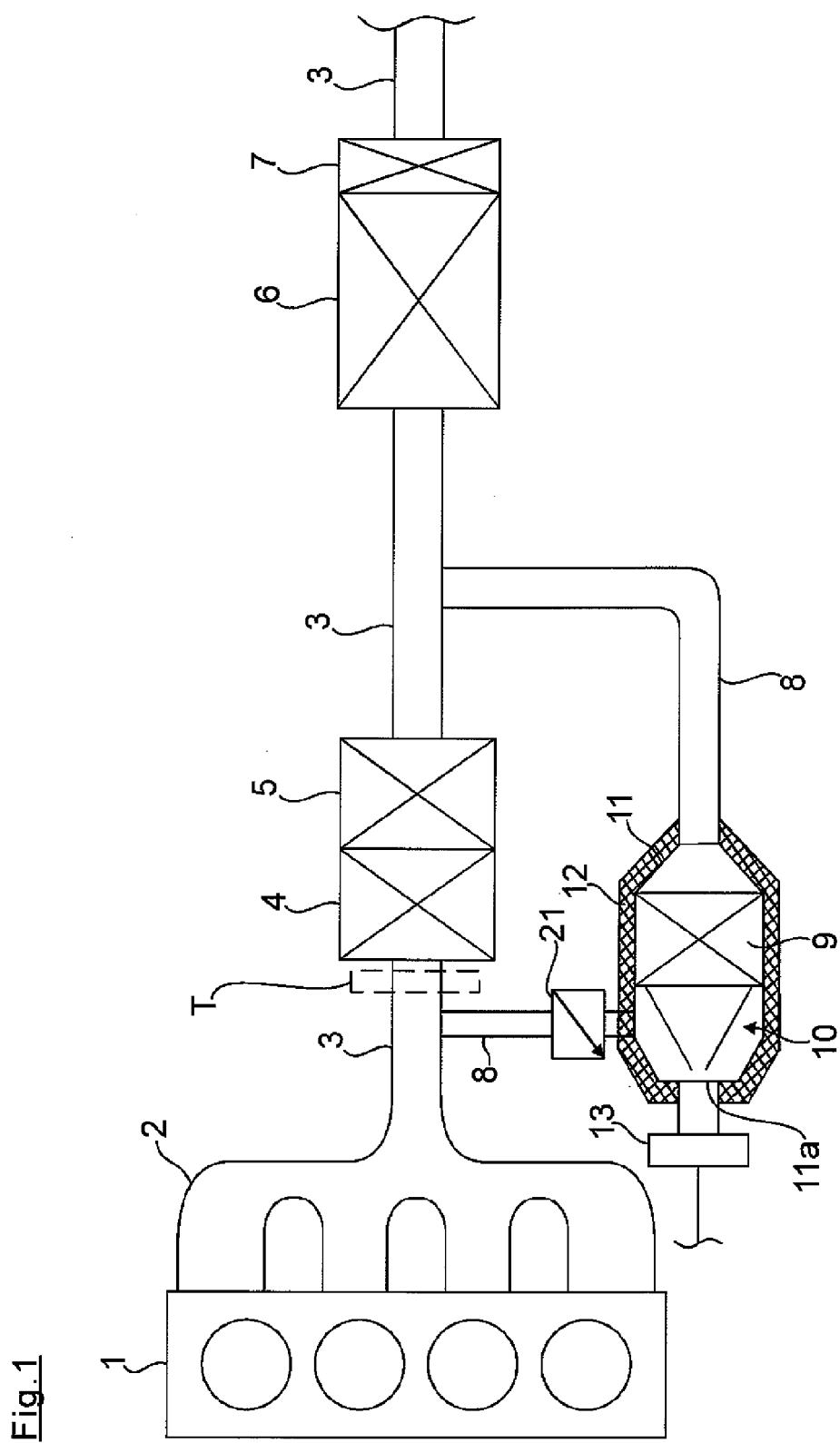
FIG. 1 is a schematic view of an exhaust gas system for internal combustion engines in motor vehicles with a hydrolysis catalyst as reductant decomposition catalyst arranged in a branch line, a metering device for a reductant, and a SCR catalyst arranged downstream of the latter.

In FIG. 1, an internal combustion engine which is merely suggested in the drawing is designated by reference numeral 1. Its exhaust gases are guided out of the combustion chambers, of which there are four in this instance, via an exhaust gas manifold 2 to an exhaust gas line 3.

Considered in the direction of the exhaust gas flow, an oxidation catalyst 4, a particulate filter 5 and, finally, a SCR catalyst 6 with a NH$_3$ slip catalyst 7 are arranged in the exhaust gas line 3. These exhaust gas aftertreatment devices 4, 5, 6 and 7 are of conventional construction are not described.

Upstream of the oxidation catalyst 4, a branch line 8 is connected to the exhaust gas line 3 and is fed back into the exhaust gas line 3 again downstream of the particulate filter 5 and upstream of the SCR catalyst 6.

A hydrolysis catalyst 9 with an inlet section 10 in front of it is provided in the branch line 8. The inlet section 10 is arranged in a common, approximately cylindrical housing 11. The housing 11 is thermally insulated on the outer side by a thermal barrier layer 12.

A nozzle 13 projects in at the front side 11a of the housing 11, and a metering device, not shown, injects an aqueous urea solution, serving as reductant.

Figure 2:
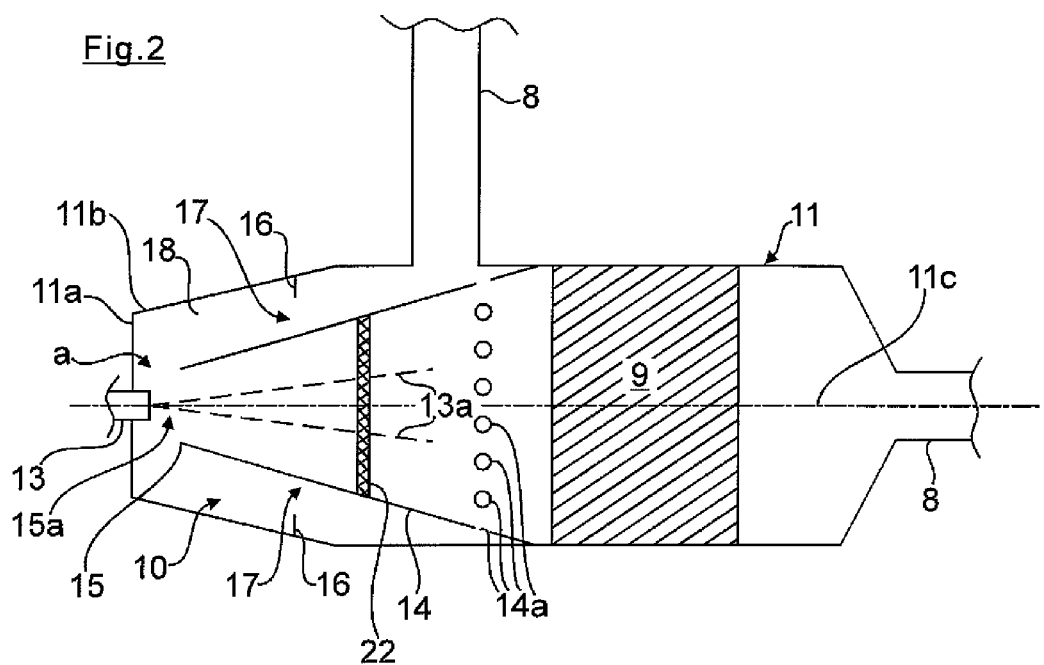
FIG. 2 is the hydrolysis catalyst according to FIG. 1 with an inlet section arranged in front of it and with a nozzle of the metering device in an enlarged view.

FIG. 2 shows the hydrolysis catalyst 9 preceded by the inlet section 10, both of which are arranged in the shared housing 11 (shown without the thermal barrier layer 12).

In the vicinity of the hydrolysis catalyst 9, the branch line 8 opens radially into an upstream conical housing portion 11b outside a conical inlet funnel 14, this housing portion 11b adjoining the front wall 11a. The inlet funnel 14 narrows in diameter from a flow cross section identical to the hydrolysis catalyst 9 in the direction toward the front wall 11a of the housing 11 and terminates at the latter as a throttling location with a substantially smaller opening cross section in an inlet opening 15 having a defined clearance distance a relative to the front wall 11a and relative to the nozzle 13 of the metering device projecting in at that location.

The flow cross section in the inlet section 10 outside the inlet funnel 14 is constructed so as to be smaller than the flow cross section inside the inlet funnel 14, which, in addition to the most compact possible constructional shape, among other things, also causes a high flow velocity of the exhaust gas in the area of the nozzle 13 and, further, inside the inlet funnel 14, causes a calming of the flow and a homogenization with a homogeneous distribution of the reductant.

As can be seen, the nozzle 13 is positioned at the front wall 11a opposite the inlet funnel 14 and, in this case, by way of example, on its longitudinal center axis 11c so that the nozzle jet 13a can be uniformly distributed within the inlet funnel 14.

A vaporizer and/or mixer 22, which are mentioned only by way of example, are arranged in the inlet funnel 14 and have a defined distance from the inlet opening 15, preferably so as to be inserted in the inlet pipe 14 by about two-thirds of its length considered from the inlet opening 15.

A throttling location 17 formed by an annular wall and/or perforated plate 16 is provided outside the inlet funnel 14 and approximately midway along its length (to have the greatest possible distance from the inlet opening 15) at the conically constructed housing portion 11b and correspondingly reduces the flow cross section in this area.

Further, optional bypass openings 14a which can be formed, for example, so as to be circular or slit-shaped are incorporated in the inlet funnel 14 so as to be distributed around the circumference of the inlet funnel 14 and in the vicinity of the inflow area of the hydrolysis catalyst 9.

The partial stream of exhaust gas which is diverted via the branch line 8 flows radially into the annular space 18 which is formed outside the inlet funnel 14 and between the housing portion 11a and whose through-flow volume can be smaller than the through-flow volume inside the inlet funnel 14. The uniform distribution of the flow is further improved by the throttling location 17 formed by an annular wall and/or a perforated plate 16. Further, owing to the resulting rise in pressure upstream of the throttling location 17a defined proportion of the partial amount of exhaust gas is guided through the bypass openings 14a directly to the hydrolysis catalyst 9 so that the homogenization of the exhaust gas flow is improved even more.

The inflowing hot exhaust gas heats the inlet funnel 14 from the outside before being deflected by about 180° in a flow deflection area 15a at the inlet opening 15 forming a throttling location as a further portion of the thermal inlet section 10 and is then guided to the hydrolysis catalyst 9 inside the inlet funnel 14 in counterflow with increasing flow cross section and, therefore, decreasing flow velocity. The aqueous urea solution is sprayed into the flow deflection area 15a via the nozzle 13 and the metering device.

The metered urea is decomposed in the inlet funnel 14 and the hydrolysis catalyst 9 by thermolysis and hydrolysis into NH$_3$ (ammonia) and, via the outgoing branch line 8, is fed back again into the exhaust gas line 3 upstream of the SCR catalyst 6 in which the nitrogen oxides contained in the exhaust gas in its entirety are reduced to nitrogen and water vapor by the reductant NH$_3$. Finally, the NH$_3$ slip catalyst 7 prevents a possible emission of NH$_3$ into the atmosphere.

Similar to the hydrolysis catalyst 9, the inlet funnel 14 is coated, for example, at its inner walls, e.g., with catalytically acting TiO$_2$ to counteract possible residues and deposits of urea, particularly when exhaust gas temperatures are not yet sufficiently high.

Figure 3:
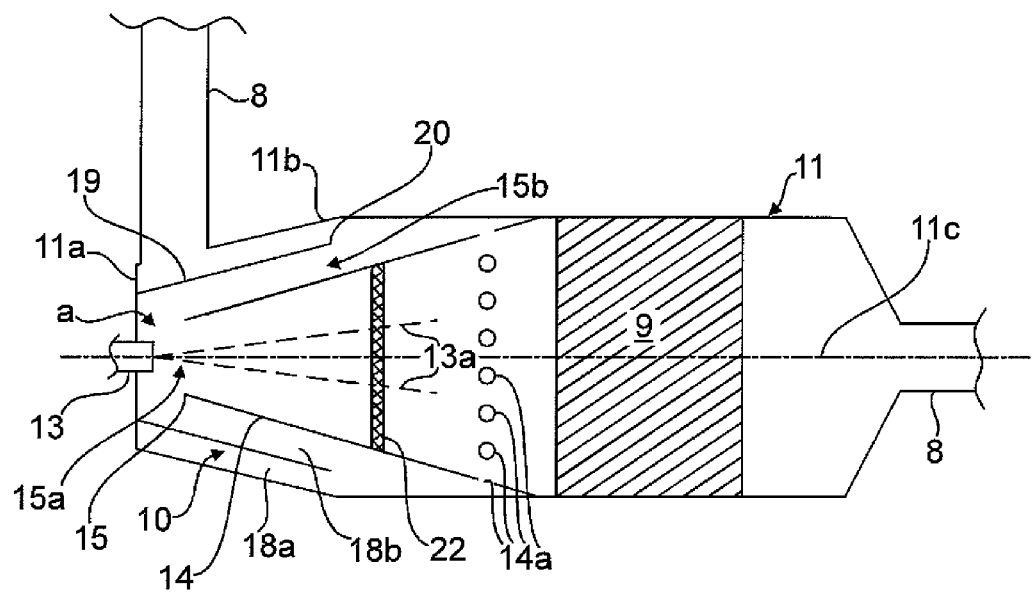
FIG. 3 is an alternative embodiment of the hydrolysis catalyst according to FIG. 2 with an additional gas guide pipe.

FIG. 3 shows an alternative construction of the upstream inlet section 10 of the hydrolysis catalyst 9 inside the housing 11 and is described only to the extent that it differs from the construction according to FIG. 2. Parts having identical functions are provided with the same reference numerals.

In contrast to FIG. 2, the branch line 8 guiding the exhaust gas opens into the housing portion 11b more in the area of the front wall 11a of the housing 11.

Further, a conical gas guide pipe 19 is fastened to the front wall 11a and extends approximately parallel to and with an approximately similar cone angle and substantially symmetric to the inlet funnel 14 approximately along half of its length and therefore divides the annular space 18 outside the inlet funnel 14 into two flow paths 18a and 18b.

The exhaust gas guided through the branch line 8 accordingly undergoes a twofold deflection flowing in the flow deflection areas 15a and 15b, namely, once at the free front side 20 of the gas guide pipe 19 and a second time at the inlet opening 15 of the inlet funnel 14, into the inlet funnel 14 and then into the hydrolysis catalyst 9. It is clear that the inlet section 10 is enlarged once more through the use of the gas guide pipe 19 while maintaining the most compact installation space.

Here again, a proportion of the exhaust gas quantity can also flow via the optional bypass openings 14a directly via the flow path 18a to the hydrolysis catalyst 9.

As was already mentioned, the inlet funnel 14 according to FIGS. 2 and 3 can also be constructed without bypass openings 14a, if so desired, so as to prevent a direct incident flow against the hydrolysis catalyst 9 and so that the partial flow of exhaust gas is guided in its entirety via the inlet section 10.

FIG. 4 shows another alternative construction and is described only to the extent that it differs from the construction according to FIGS. 2 and 3. Parts having identical functions are provided with the same reference numerals. In particular, FIG. 4 shows, by way of example, the use of deflecting plates 15c in the area of the inlet opening 15 of the inlet funnel 14 which serve to increase the turbulence downstream of the reductant feed. In contrast to the vaporizer or mixer 22, the deflection plates 15c are positioned in such a way that the reductant does not impinge on them so as to prevent deposits at these structural component parts.

The deflection plates can have any desired geometry. A zigzag, fan-shaped or annular geometry is particularly preferable. FIG. 5 is a top view of the inlet funnel 14 with two half-circular deflection plates 15c which are shown only by way of example by cross-hatching. In addition, a feed 8' of the exhaust gas is offset and/or inclined eccentrically with respect to the center axes $M_1$, $M_2$, i.e., for example, not at right angles to the circumference of the housing of the inlet section 10. Accordingly, a swirl is impressed upon the exhaust gas flow, by which the distribution of the exhaust gas and of the reductant can be influenced.

Figure 6:
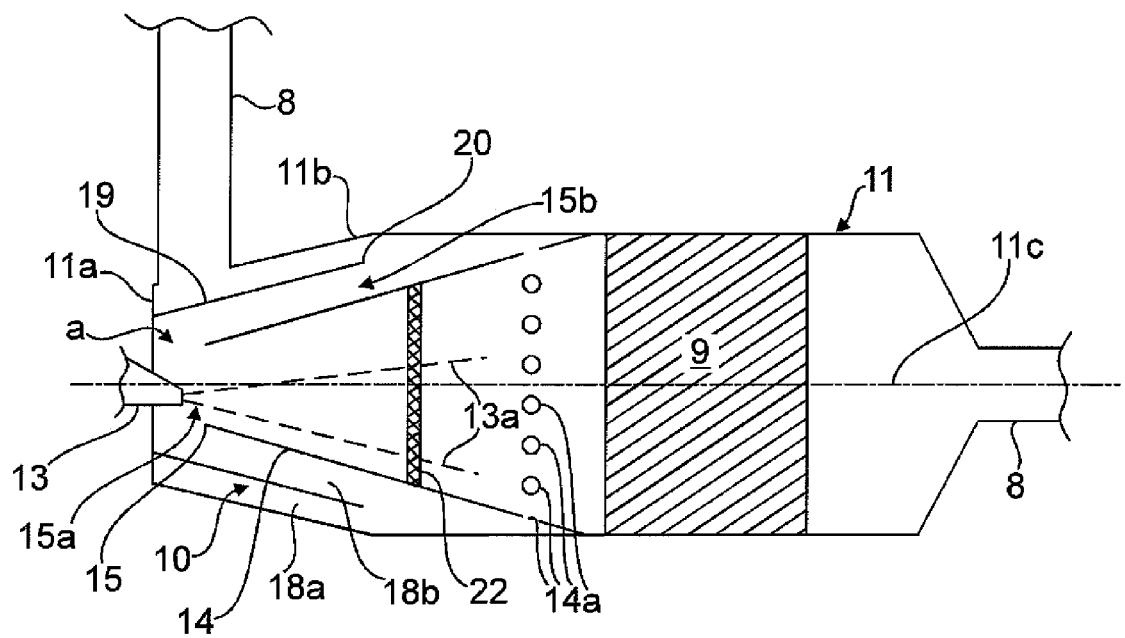
FIG. 6 is an alternative embodiment of the hydrolysis catalyst with an eccentrically offset nozzle.

Finally, FIG. 6 shows an embodiment form in which the nozzle 13 sprays at an eccentric offset relative to the longitudinal center axis 110 of the inlet pipe 14 so that the local reductant amount is adapted to the flow velocities, which facilitates a good mixing of reductant and exhaust gas flow. Of course, a construction of this kind with an eccentrically offset nozzle 13 can also be provided in principle in the construction according to FIGS. 2, 3 and 4. It is, of course, also possible to carry over the nozzle position in the construction according to FIG. 2, for example, to the construction according to FIG. 6.

Further, according to FIG. 1, a controllable throttle valve 21 is inserted in the branch line 8 upstream of the hydrolysis catalyst 9. This throttle valve 21 controls the diverted partial quantity of exhaust gas in accordance with operating parameters of the internal combustion engine 1 such as, e.g., load requirement, rotational speed, temperature, etc., so that its throughput can be adapted more or less to the respective total amount of exhaust gas.

However, it may also be sufficient, as the case may be, when the oxidation catalyst 4 generating an exhaust gas counterpressure depending on function and the diesel particulate filter 5 are used as throttling devices in that the branch line 8 correspondingly branches off upstream and opens into the exhaust gas line 3 again downstream.

The branch line 8 can also be connected to the exhaust gas line 3 upstream of the exhaust gas turbine as an additional throttling device in a turbocharged internal combustion engine with exhaust gas turbines T of the exhaust gas turbocharger (shown only in a highly schematic manner in dashes in FIG. 1) located in the exhaust gas train.

When the internal combustion engine 1 has, for example, a divided exhaust gas guiding with associated cylinder groups or, in case of a V-type internal combustion engine, with associated cylinder banks so that there are, for example, two exhaust gas manifolds 2 and exhaust gas lines 3 with corresponding exhaust gas turbochargers and/or catalysts 4, 5, 6, 7, the branch line 8 with the hydrolysis catalyst 9 and the inlet section 10 can preferably branch off from one of the exhaust gas lines 3. This has the advantage that this cylinder group or cylinder bank can be operated in such a way by an engine control device that the exhaust gas temperature in this exhaust gas train is increased depending on operating parameters such as cold start, idling or low-load in order to achieve an early, efficient decomposition of the injected reductant or urea solution. The other cylinder group or cylinder bank can be operated so as to be optimized with respect to efficiency and/or at a low load.

The branched off partial amount of exhaust gas is fed to the two divided exhaust gas trains or the two exhaust gas lines 3 upstream of the SCR catalyst 6 after being treated in the hydrolysis catalyst 9.

However, the divided exhaust gas system can also be constructed in such a way that it is combined again to form one exhaust gas line 3 in front of an individual SCR catalyst 6.

It should be noted that the arrangement of the hydrolysis catalyst 9 with the inlet section 10 need not be constructed, as is shown, in a separate housing 11. The structural component parts 9 and 10 can, if desired, also be installed in a housing with the oxidation catalyst 4 and/or the diesel particulate filter 5.

Platinum and/or palladium and/or rhodium and/or cerium and/or oxides thereof and/or zeolites are preferably used as active catalytic materials for the oxidation catalyst 4 for the oxidation of nitrogen monoxide. Vanadium and/or vanadium (V) oxide and/or titanium dioxide and/or tungsten oxide and/or copper-containing zeolites and/or iron-containing zeolites and/or cobalt-containing zeolites can also advantageously be used as active components for the SCR catalysts for reducing nitrogen oxides by ammonia.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A device for the aftertreatment of exhaust gases in an exhaust gas system of an internal combustion engine, comprising:
- at least one reductant decomposition catalyst arranged in the exhaust gas flow, wherein the at least one reductant decomposition catalyst is a hydrolysis catalyst;
- a metering device arranged upstream of the at least one reductant decomposition catalyst in an exhaust gas line for supplying reductant, wherein the reductant is an aqueous urea solution;
- at least one other catalyst device provided downstream of the reductant decomposition catalyst;
- an inlet section for the exhaust gas comprising at least one flow deflection area arranged upstream of the reductant decomposition catalyst and constructed such that the exhaust gas is fed into a housing portion radially outside an inlet pipe adjoining the reductant decomposition catalyst, the housing portion enclosing the inlet pipe;
- a front inlet opening of the inlet pipe through which the exhaust gas is guided in counterflow to the reductant decomposition catalyst,
- wherein the reductant is fed into the flow deflection area of the exhaust gas flow, which flow deflection area is associated with the inlet opening, and
- at least one additional gas guide pipe arranged in the housing portion radially outside the inlet pipe that causes a gas flow in a meandering shape with the exhaust gas flow being deflected a number of times between the exhaust gas line opening radially into this area and the reductant decomposition catalyst,
- wherein the at least one additional gas guide pipe is fastened to a front wall of the housing portion enclosing the inlet pipe and having a cone angle substantially identical to that of the inlet pipe, and
- the at least one additional gas guide pipe is formed by a plurality of pipes that are nested one inside the other by a plurality of conical pipes which are nested one inside the other.

2. The device according to claim 1, wherein the at least one other catalyst device is at least one SCR catalyst.

3. The device according to claim 1, further comprising at least one throttling device for at least partial throttling of the exhaust gas flow provided in the area of the inlet section upstream of the reductant feed.

4. The device according to claim 3, wherein at least one of:
- a flow cross section in the area of the inlet section is smaller upstream of the reductant feed than downstream of the reductant feed and
- a through-flow volume in the inlet section outside the inlet pipe is smaller than the through-flow volume inside a defined inlet area of the inlet pipe.

5. The device according to claim 4, further comprising a nozzle of the metering device for feeding the reductant arranged in the flow deflection area is at least one of associated with the inlet opening and directed toward the inlet opening, wherein the nozzle is one of:
- arranged at a front wall of the housing portion that encloses the inlet pipe and is arranged at a defined distance opposite the inlet opening of the inlet pipe and
- arranged one of coaxial to and offset eccentrically relative to the longitudinal center axis of the inlet pipe with respect to its injection direction into the inlet opening of the inlet pipe.

6. The device according to claim 5, further comprising:
- at least one device deflection plate configured for at least one of deflecting the flow and increasing turbulence is arranged downstream of the reductant feed, arranged at least partially around the inlet opening and
- the at least one device for the at least one of deflecting the flow and increasing turbulence is arranged such that reductant is sprayed by the nozzle does not impinge on at least one device for the at least one of deflecting the flow and increasing turbulence.

7. The device according to claim 6, wherein flow velocity is increased in areas in which there is an amount of reductant by installed structures configured to change the cross section in relation to those areas in which there is a comparatively lower amount of reductant.

8. The device according to claim 7, further comprising at least one of:
- a vaporizer and a mixer arranged downstream of the reductant feed, in the inlet pipe at a defined distance from the inlet opening.

9. The device according to claim 8, wherein at least one bypass opening, preferably a plurality of bypass openings which are in particular distributed around a circumference, of the inlet pipe.

10. The device according to claim 9, further comprising at least one additional throttling location for the inflowing exhaust gas provided in the housing portion that radially surrounds the inlet pipe upstream of the flow deflection area associated with the inlet opening and upstream of the reductant feed and outside of the inlet pipe.

11. The device according to claim 10, wherein the throttling location is arranged at a defined distance from the inlet opening of the inlet pipe and the throttling location is formed by at least one cross-sectional narrowing an annular space enclosing the inlet pipe, which cross-sectional narrowing is formed by at least one of an annular wall and a perforated plate that opens a through-flow gap.

12. The device according to claim 8, wherein the at least one of the vaporizer and the mixer is inserted in the inlet pipe to about two-thirds of the length of the inlet pipe considered from the inlet opening.

13. A device for the aftertreatment of exhaust gases in an exhaust gas system of an internal combustion engine, comprising:
- at least one reductant decomposition catalyst arranged in the exhaust gas flow, wherein the at least one reductant decomposition catalyst is a hydrolysis catalyst;
- a metering device arranged upstream of the at least one reductant decomposition catalyst in an exhaust gas line for supplying reductant, wherein the reductant is an aqueous urea solution;
- at least one other catalyst device provided downstream of the reductant decomposition catalyst;
- an inlet section for the exhaust gas comprising at least one flow deflection area arranged upstream of the reductant decomposition catalyst and constructed such that the exhaust gas is fed into a housing portion radially outside an inlet pipe adjoining the reductant decomposition catalyst, the housing portion enclosing the inlet pipe;
- a front inlet opening of the inlet pipe through which the exhaust gas is guided in counterflow to the reductant decomposition catalyst, wherein the reductant is fed into the flow deflection area of the exhaust gas flow, which flow deflection area is associated with the inlet opening, at least one throttling device for at least partial throttling of the exhaust gas flow provided in the area of the inlet section upstream of the reductant feed, wherein at least one of:
- a flow cross section in the area of the inlet section is smaller upstream of the reductant feed than downstream of the reductant feed and
- a through-flow volume in the inlet section outside the inlet pipe is smaller than the through-flow volume inside a defined inlet area of the inlet pipe;

a nozzle of the metering device for feeding the reductant arranged in the flow deflection area is at least one of associated with the inlet opening and directed toward the inlet opening, wherein the nozzle is one of:
- arranged at a front wall of the housing portion that encloses the inlet pipe and is arranged at a defined distance opposite the inlet opening of the inlet pipe and
- arranged one of coaxial to and offset eccentrically relative to the longitudinal center axis of the inlet pipe with respect to its injection direction into the inlet opening of the inlet pipe;

at least one device deflection plate configured for at least one of deflecting the flow and increasing turbulence is arranged downstream of the reductant feed, arranged at least partially around the inlet opening, the at least one device for the at least one of deflecting the flow and increasing turbulence is arranged such that reductant is sprayed by the nozzle does not impinge on at least one device for the at least one of deflecting the flow and increasing turbulence, wherein flow velocity is increased in areas in which there is an amount of reductant by installed structures configured to change the cross section in relation to those areas in which there is a comparatively lower amount of reductant;

at least one of a vaporizer and a mixer arranged downstream of the reductant feed, in the inlet pipe at a defined distance from the inlet opening, wherein at least one bypass opening, preferably a plurality of bypass openings which are in particular distributed around a circumference, of the inlet pipe;

at least one additional throttling location for the inflowing exhaust gas provided in the housing portion that radially surrounds the inlet pipe upstream of the flow deflection area associated with the inlet opening and upstream of the reductant feed and outside of the inlet pipe, wherein the throttling location is arranged at a defined distance from the inlet opening of the inlet pipe and the throttling location is formed by at least one cross-sectional narrowing an annular space enclosing the inlet pipe, which cross-sectional narrowing is formed by at least one of an annular wall and a perforated plate that opens a through-flow gap; and at least one additional gas guide pipe arranged in the housing portion radially outside the inlet pipe that causes a gas flow in a meandering shape with the exhaust gas flow being deflected a number of times between the exhaust gas line opening radially into this area and the reductant decomposition catalyst, wherein the at least one additional gas guide pipe is fastened to a front wall of the housing portion enclosing the inlet pipe and having a cone angle substantially identical to that of the inlet pipe, and the at least one additional gas guide pipe is formed by a plurality of pipes that are nested one inside the other by a plurality of conical pipes which are nested one inside the other.

14. The device according claim 13, wherein the feed of exhaust gas into the housing enclosing the inlet section is inclined at an angle to the housing and is carried out so as to be offset eccentrically with respect to the center axes of the housing.

* * * * *